(12) United States Patent
Breeden

(10) Patent No.: US 7,942,360 B2
(45) Date of Patent: May 17, 2011

(54) RETRACTABLE TOW STRAP

(75) Inventor: Winston Breeden, Chagrin Falls, OH (US)

(73) Assignee: Winston Products LLC, Cleveland, OH (US)

( * ) Notice: Subject to any disclaimer, the term of this patent is extended or adjusted under 35 U.S.C. 154(b) by 38 days.

(21) Appl. No.: 11/504,385

(22) Filed: Aug. 15, 2006

(65) Prior Publication Data

US 2007/0170295 A1 Jul. 26, 2007

Related U.S. Application Data

(60) Provisional application No. 60/761,947, filed on Jan. 25, 2006.

(51) Int. Cl.
*B65H 75/48* (2006.01)
(52) U.S. Cl. ............... 242/378.1; 254/213; 254/221; 280/480.1; 242/378.3
(58) Field of Classification Search ............. 242/378, 242/378.1, 375, 375.1, 371, 388, 388.1, 378.2, 242/378.3, 370, 390, 398, 407, 372; 280/480, 280/480.1; 254/213, 214, 221, 217
See application file for complete search history.

(56) References Cited

U.S. PATENT DOCUMENTS

| 1,585,435 | A | * | 5/1926 | Summers et al. | 280/480 |
| 3,425,646 | A | * | 2/1969 | Hollowell | 242/376 |
| 3,826,473 | A | * | 7/1974 | Huber | 242/388.3 |
| 3,881,751 | A | * | 5/1975 | Colby | 280/480 |
| 4,155,537 | A | * | 5/1979 | Bronson et al. | 242/388.3 |
| 4,416,429 | A | * | 11/1983 | Jessamine | 242/388.1 |
| 6,092,826 | A | * | 7/2000 | Pingel et al. | 280/480.1 |
| 6,349,893 | B1 | * | 2/2002 | Daoud | 242/376 |
| 2006/0027697 | A1 | * | 2/2006 | Gojanovic et al. | 242/388.1 |

* cited by examiner

*Primary Examiner* — Michael R Mansen
*Assistant Examiner* — Juan J Campos
(74) *Attorney, Agent, or Firm* — Pearne & Gordon LLP

(57) ABSTRACT

A retractable tow strap apparatus for towing a vehicle includes a protective casing and a reel including a hub. The tow strap apparatus further include a tow strap webbing for winding about the hub, means for attaching at least one end of the tow strap webbing to a vehicle to be towed, and means for biasing the reel to wind the tow strap onto the hub. When the tow strap is in a fully extended position, the tow strap apparatus is configured to transmit substantially all of a tension force applied by a towing vehicle to a towed vehicle through only the tow strap. In addition or alternatively, the means for biasing applies a biasing force to automatically wind the tow strap webbing onto the hub. In addition or alternatively, the tow strap webbing is non-disjoint and includes two ends that are each extendable from the casing.

24 Claims, 6 Drawing Sheets

US 7,942,360 B2

RETRACTABLE TOW STRAP

RELATED APPLICATIONS

This application claims the benefit of U.S. Provisional Application No. 60/761,947, filed on Jan. 25, 2006, the entire disclosure of which is hereby incorporated herein by reference.

FIELD OF THE INVENTION

The present invention relates generally to a tow strap for towing a vehicle, and in particular, to a retractable tow strap for towing a vehicle.

BACKGROUND OF THE INVENTION

Tow straps can be used to tow a wide variety of vehicles. Conventionally, an initially slack or loose tow strap is attached between a towing vehicle and a towed vehicle. As the towing vehicle moves, the slack is removed and a tension force is transmitted therebetween from the towing vehicle to the towed vehicle. However, several problems can occur. In one example, during the towing process, slack can be generated when the towing vehicle slows down, such as to stop or make a turn. The slack can cause the tow strap to be unable to maintain tension, slide under the wheel of the towed vehicle, and/or be caught around the various moving parts of the vehicle. Also, the slack tow strap can drag on the ground and can become dirty or caught on a ground hazard. Additionally, the slack can cause the tow strap to move or dislodge from one of the vehicles and/or can cause a sudden jerking motion when the towing car accelerates back up to speed. In another example problem, the loose tow strap can be difficult to wind and store, especially when a relatively longer length tow strap is used. Accordingly, it would be beneficial to provide a retractable tow strap apparatus that can overcome the aforementioned problems.

BRIEF SUMMARY OF THE INVENTION

The following presents a simplified summary of the invention in order to provide a basic understanding of some aspects of the invention. This summary is not an extensive overview of the invention. It is intended to identify neither key nor critical elements of the invention nor delineate the scope of the invention. Its sole purpose is to present some concepts of the invention in a simplified form as a prelude to the more detailed description that is presented later.

In accordance with an aspect of the present invention, a retractable tow strap apparatus for towing a vehicle is provided, including a protective casing and a reel disposed within the casing and including a hub. The tow strap apparatus also includes a tow strap for winding about the hub between a fully extended position and a fully retracted position such that, in the fully retracted position, the tow strap is wound about the hub. The tow strap further includes a tow strap webbing and means for attaching at least one end of the tow strap webbing to a vehicle to be towed. The tow strap apparatus further includes means for biasing the reel to wind the tow strap onto the hub. When the tow strap is in the fully extended position, the tow strap apparatus is configured to transmit substantially all of a tension force applied by a towing vehicle to a towed vehicle through only the tow strap.

In accordance with another aspect of the present invention, a retractable tow strap apparatus for towing a vehicle is provided including a protective casing, and a reel disposed within the casing and including a hub. The tow strap apparatus further includes a tow strap webbing for winding about the hub and having a sufficient strength for towing a vehicle. The tow strap apparatus further includes means for attaching at least one end of the tow strap webbing to a vehicle to be towed, and means for biasing the tow strap webbing to wind onto the hub by applying a biasing force to the tow strap webbing. The means for biasing is configured to automatically wind the tow strap webbing onto the hub when the biasing force is greater than an oppositely directed tension force applied by a towing vehicle to a towed vehicle.

In accordance with another aspect of the present invention, a retractable tow strap apparatus for towing a vehicle is provided including a protective casing and a reel disposed within the casing and including a hub. The tow strap apparatus further includes a non-disjoint tow strap webbing for winding about the hub between a fully extended position and a fully retracted position and having a sufficient strength for towing a vehicle. The tow strap webbing includes two ends that are each extendable from the casing. The tow strap apparatus further includes means for attaching at least one end of the tow strap webbing to a vehicle to be towed and means for winding the tow strap webbing onto the hub. The means for winding is configured to rotationally couple the reel to the casing.

In accordance with another aspect of the present invention, a retractable tow strap apparatus for towing a vehicle is provided including a protective casing having at least two opposing apertures extending therethrough. The at least two apertures are configured to be generally co-planar. The tow strap apparatus further includes a reel disposed within the casing and including a hub having an aperture extending therethrough. The aperture is configured to be generally co-planar with the at least two apertures of the protective casing. The tow strap apparatus further includes a tow strap webbing for winding about the hub between a fully extended position and a fully retracted position and having a sufficient strength for towing a vehicle. In the fully extended position, the tow strap extends sequentially through one of the apertures of the protective casing, through aperture of the hub, and through the other aperture of the protective casing such that a tension force can be applied generally linearly along a longitudinal axis of the tow strap webbing. The tow strap apparatus further includes means for attaching at least one end of the tow strap webbing to a vehicle to be towed, and means for winding the tow strap webbing onto the hub. The means for winding is configured to rotationally couple the reel to the casing.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF EXAMPLE EMBODIMENTS

Figure 1:
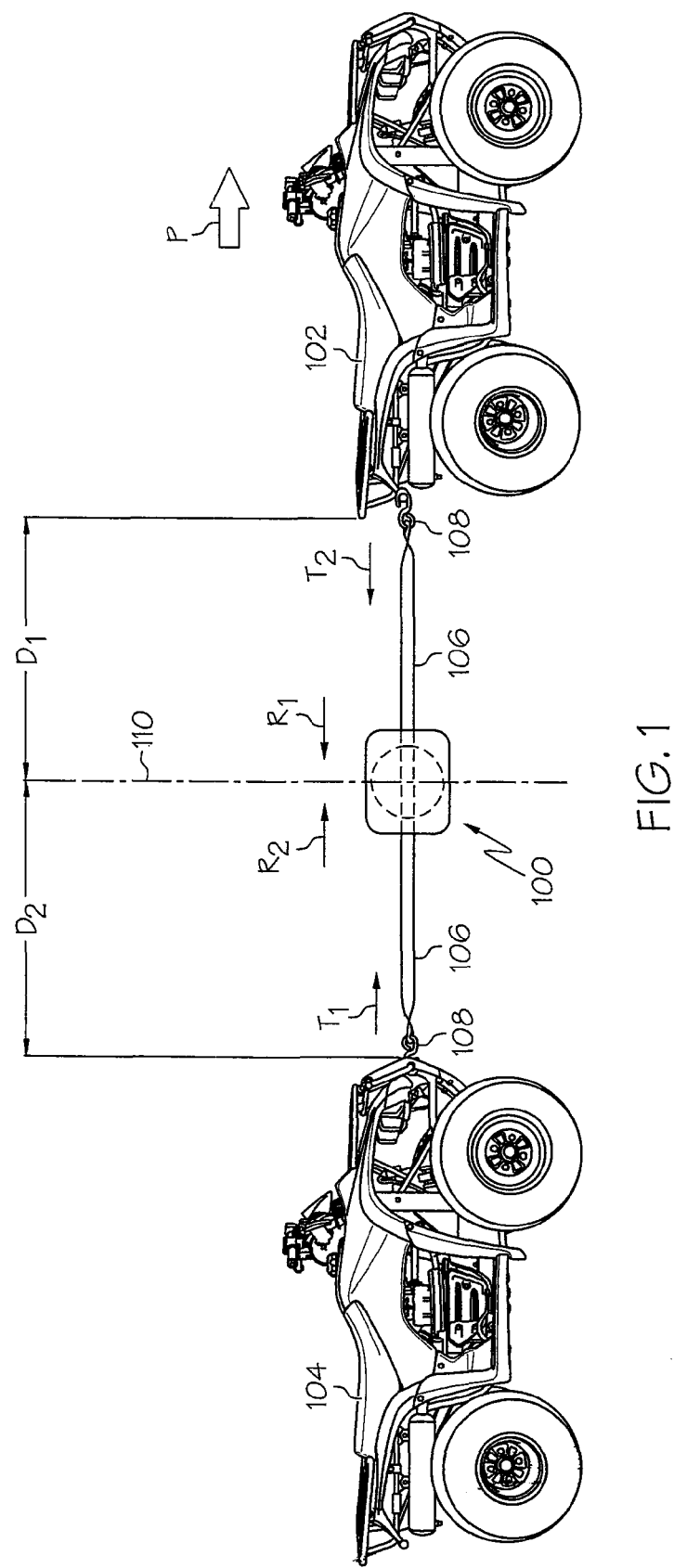
FIG. 1 schematically illustrates an example use for an example retractable tow strap apparatus in accordance with an aspect of the present invention.

An example embodiment of a device that incorporates aspects of the present invention is shown in the drawings. It is to be appreciated that the shown example is not intended to be a limitation on the present invention. For example, one or more aspects of the present invention can be utilized in other embodiments and even other types of devices.

Turning to the shown example of FIG. 1, an example use for a retractable tow strap apparatus 100 is illustrated schematically in accordance with an aspect of the present invention. In the shown example, the retractable tow strap apparatus 100 is attached between a towing vehicle 102 (e.g., the vehicle providing a motive force for towing) and a towed vehicle 104 (e.g., the vehicle being towed by the towing vehicle). As shown, the vehicles 102, 104 can include all-terrain vehicles (ATV's), though the retractable tow strap apparatus 10 can also be used with various other wheeled and non-wheeled vehicles. For example, the apparatus 10 can be used with cars, trucks, boats, motorcycles, bicycles, agricultural equipment, trailers, containers, and/or various other wheeled or non-wheeled equipment. The apparatus 10 can be used to tow a vehicle (e.g., move it from one place to another), and/or to help retrieve a stuck or disabled vehicle, such as may occur in wet, muddy, or snowy conditions.

The tow strap apparatus 100 includes tow strap webbing 106 that can be attached to both of the vehicles 102, 104 by a means for attaching 108, such as a hook or the like. When the towing vehicle 102 moves in a forward direction as shown by arrow P, a tension force $T_1$ is applied to the towed vehicle 104 through the tow strap webbing 106 to thereby tow (e.g., move) the towed vehicle 104 in the direction P. It is to be appreciated that a generally equal and opposite tension force $T_2$ will be applied to the towing vehicle 102 from the towed vehicle 104. Additionally, the tow strap apparatus 100 can provide a biasing force $R_1$, $R_2$ (e.g., $R_1$ being generally equal and opposite to $R_2$) to automatically retract the tow strap webbing 106 when the biasing force $R_1$, $R_2$ is greater than the oppositely directed tension force $T_1$, $T_2$, such as when slack is about to occur in the tow strap webbing 106. Further still, when the tow strap webbing 106 is in a fully extended position, a distance $D_1$ between the towing vehicle 102 and a centerline 110 of the tow strap apparatus 100 can be generally equal to a distance $D_2$ between the towed vehicle 104 and the centerline 110, though the distances $D_1$ and $D_2$ can also vary by a relatively small amount, such as a few inches. Thus, during a towing operation, the tension force $T_1$ can supply the motive force to tow the towed vehicle 104 in the direction P, and if any slack occurs within the tow strap webbing 106, the biasing force $R_1$, $R_2$ can automatically wind the tow strap webbing 106 to protect it from dirt, damage or the like, and/or to prevent unwanted shock forces between the vehicles 102, 104.

Figure 2:
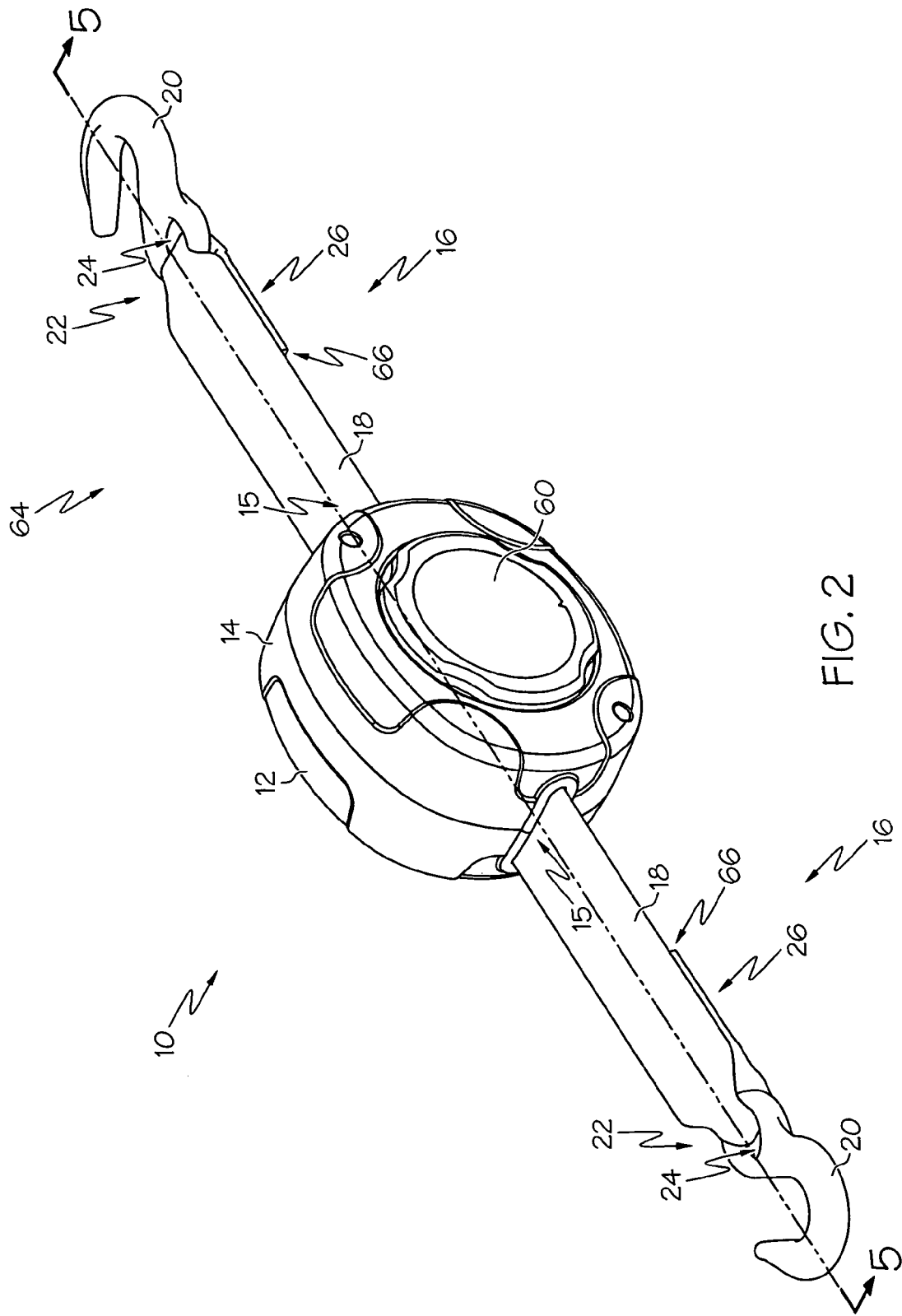
FIG. 2 illustrates a perspective view of the example tow strap apparatus in accordance with an aspect of the present invention.
Figure 3:
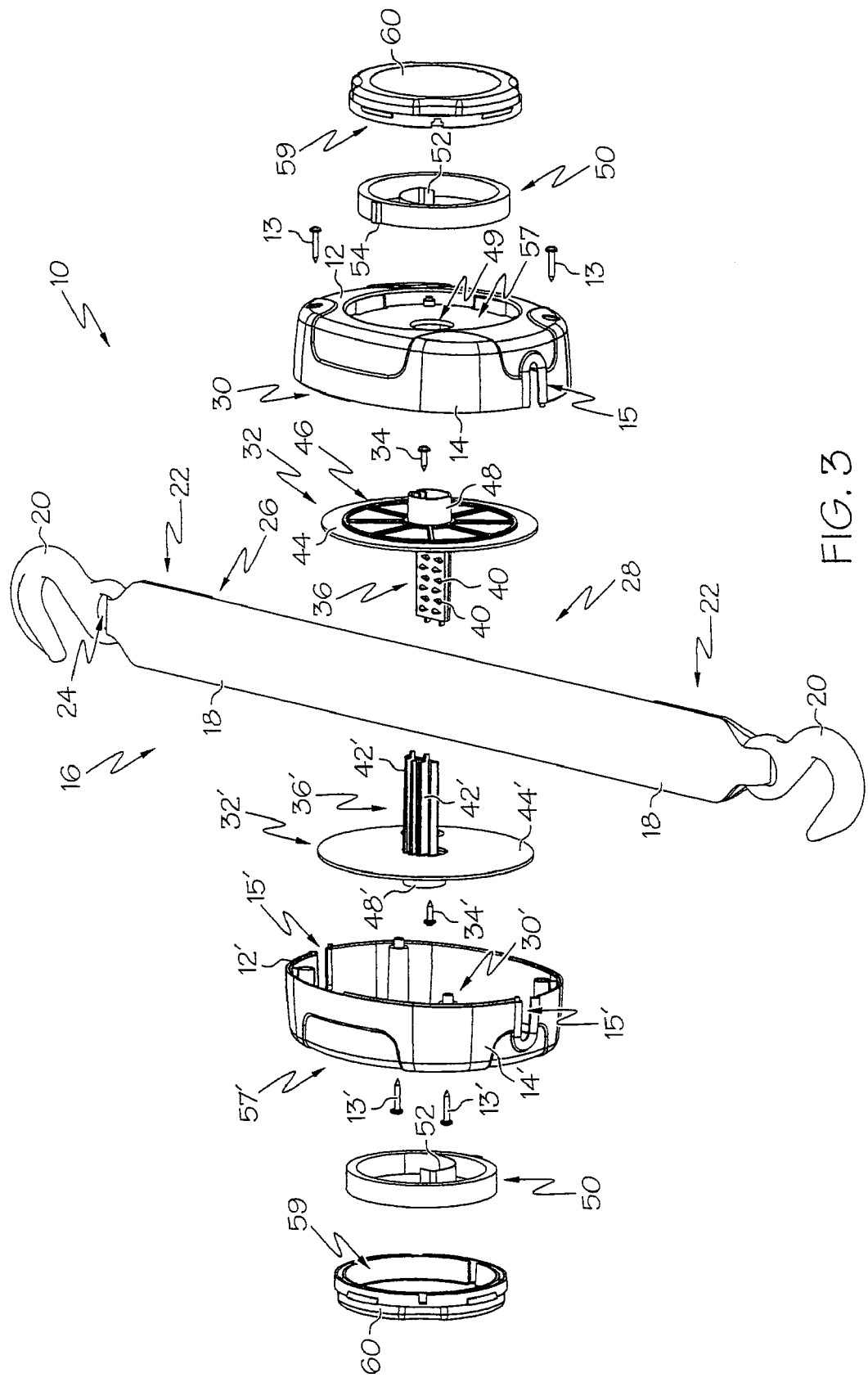
FIG. 3 illustrates an exploded perspective view of the tow strap apparatus of FIG. 2.

Turning to the shown example of FIG. 2, an example tow strap apparatus 10 for towing a vehicle is provided. The tow strap apparatus 10 can include a protective casing 12 adapted to protect the various elements of the tow strap apparatus 10 from damage, such as during storage. The protective casing 12 can include a rigid and durable material, such as metals, plastics, and/or hard rubbers. Additionally, as shown in FIG. 3, the casing 12 can include two generally identical halves 12, 12' that can include portions that are identical or similar. For the sake of brevity, only one half 12 will be discussed herein. However, to indicate the identical or similar structure, identical reference numerals, which have a prime designation (e.g., "'"), are utilized. The halves of the casing 12 may have identical construction, or they may have certain dissimilar features without deviating from the present invention.

Figure 5:
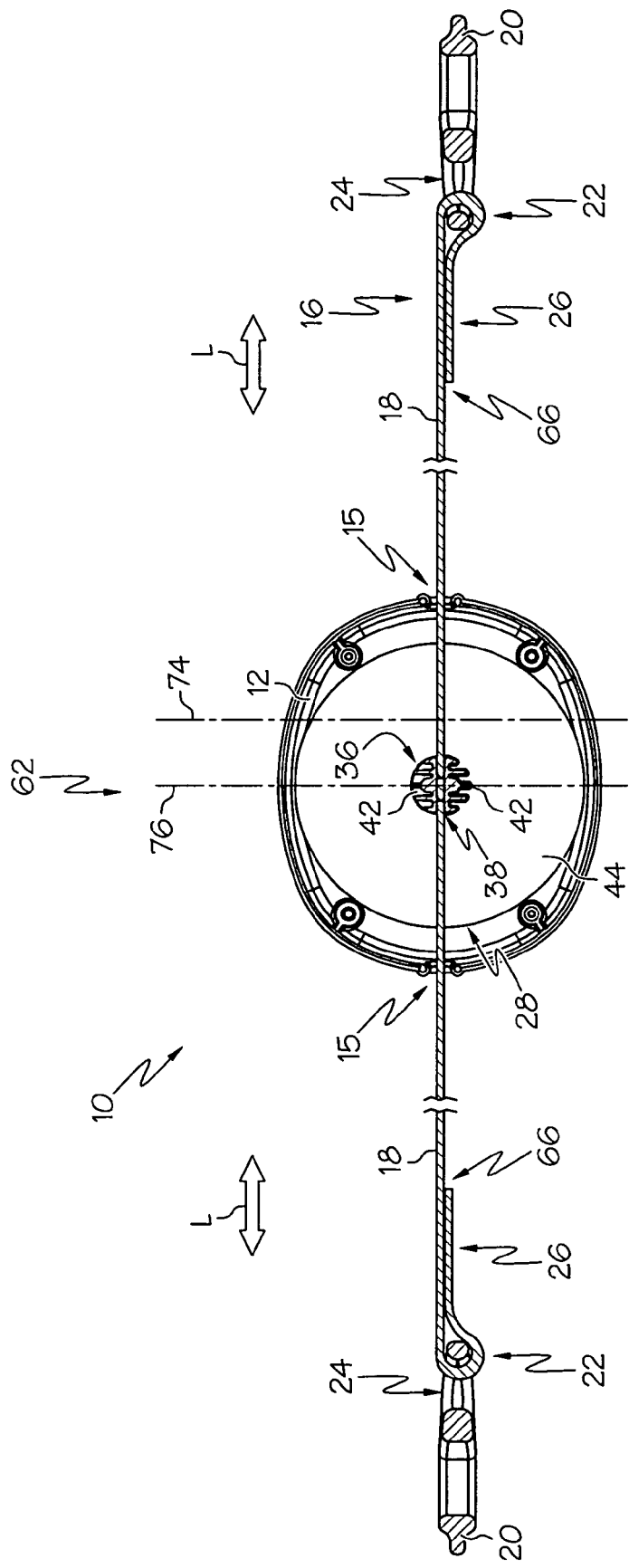
FIG. 5 schematically illustrates a sectional view of the tow strap apparatus along line 5-5 of FIG. 2.

Further, the casing 12 can include a protective insert 14, such as a rubberized insert or the like, that can provide additional protection for the casing 12 and/or for other surfaces, such as a storage location within a vehicle. The two halves of the casing 12, 12' can be attached in various manners, such as with adhesives, welding, snap fittings, or fasteners, such as screws 13, 13'. Further still, the casing 12 can include at least two opposing apertures 15 extending therethrough. As shown in FIG. 5, the two apertures 15 can be configured to be generally co-planar, though either can be located relatively higher or lower than the other.

Keeping with the example shown in FIG. 2, the tow strap apparatus 10 can further include a tow strap 16 configured to extend through the apertures 15 of the casing 12. The tow strap 16 can include a tow strap webbing 18 that can include various materials having a sufficient strength for towing a vehicle, such as a nylon webbing or the like. Additionally, the tow strap 16 can have various lengths, such as 5 feet, 10 feet, or 20 feet, though various other distances are also contemplated to be within the scope of this disclosure. The tow strap webbing 18 can be non-disjoint and formed from a uniform piece of material, or it can also include various sections joined together in various manners. Further, the tow strap webbing 18 can include two ends 22 that are each extendable from and retractable into the casing 12. In one example, both ends 22 are extendable from the casing 12 a generally equal distance.

The tow strap 16 can also include means for attaching 20 one end 22 of the tow strap webbing 18 to a vehicle to be towed 104 (see FIG. 1). In one example, the means for attaching 20 can include a hook, though various other coupling elements can also be used, such as straps, loops, clips, magnets, hitches, or the like. The means for attaching 20 can be either removably or non-removably connected to the tow strap webbing 18 in various manners. For example, the hook 20 can include an eye 24 through which a portion of the tow strap webbing 18 can be received. The tow strap webbing 18 can then be folded over on itself and attached to another portion 26 of the webbing in various manners, such as by adhesives, stitching, welding, or the like.

Turning now to the example shown in FIG. 3, the tow strap apparatus 10 can further include a reel 28 disposed within an interior area 30 of the casing 12. The reel 28 can include a single body, or it can be formed of multiple pieces, such as two halves 32, 32'. The two halves 32, 32' can be attached using various methods, such as adhesives, welding, snap fittings, or fasteners, such as screws 34 or the like. As before, similar or identical structure is noted with a prime designation (e.g., "'").

Additionally, the reel can include a hub 36 for winding the tow strap webbing 18 thereon. It is to be appreciated that the tow strap webbing 18 can be wound about the reel 28 and hub 36 in various manners. In one example, the tow strap webbing 18 can be wound about the hub 36 and progressively wrapped about itself to form a doubly-wound roll. As shown, the hub 36 can include two halves, or it can also be formed as a single unit with one of halves 32, 32' of the reel 28. Thus, the hub 36 can have a generally tubular geometry to permit the webbing 18 to wind thereon when the reel 28 is rotated. In addition, as shown in FIG. 5, the hub 36 can include an aperture 38 extending therethrough. The aperture 38 can have a geometry similar to that of the webbing 18 to permit the webbing 18 to extend completely through. Further, the aperture 38 of the hub 36 can be configured to be generally co-planar with the at least two apertures 15 of the protective casing 12.

The hub 36 can also include various other features. In one example, the hub 36 can include grasping structure, such as teeth 40, configured to grasp a portion of the tow strap webbing 18. It can be beneficial to inhibit the webbing 18 from moving with respect to the aperture 38 of the hub 36 to ensure that the webbing 18 remains aligned relative to the hub 36 and the protective casing 12. For example, proper alignment of the webbing 18 relative to the hub 36 and casing 12 can facilitate consistent winding and unwinding of the webbing 18 relative to the reel 28. Additionally, the hub 36 can include support structure, such as ribs 42, bracing, or the like, to provide structural support for the webbing 18 as it is wound and unwound about the reel 28. The ribs 42 can also inhibit slippage of the webbing 18 relative to the hub 36 when it is wound and unwound thereon.

The reel 28 can also include additional features. For example, the reel 28 can include sidewalls 44 configured to retain the tow strap webbing 18 as it is wound about the hub 36. The sidewalls 44 can include ribs 46 or the like to provide additional structural support. In addition or alternatively, each half 32, 32' of the reel 28 can also include a protrusion 48 having a generally cylindrical geometry. The cylindrical protrusion 48 can be configured to be rotatably supported by a similarly shaped hole 49 extending through the protective casing 12, 12'. Thus, the protrusion 48 can cooperate with the hole 49 to form a bushing or the like adapted to rotatably support the reel 28 relative to the casing 12. In addition or alternatively, the reel 28 and/or casing 12 can include a bearing or the like to facilitate the rotational support of the reel 28.

Figure 4:
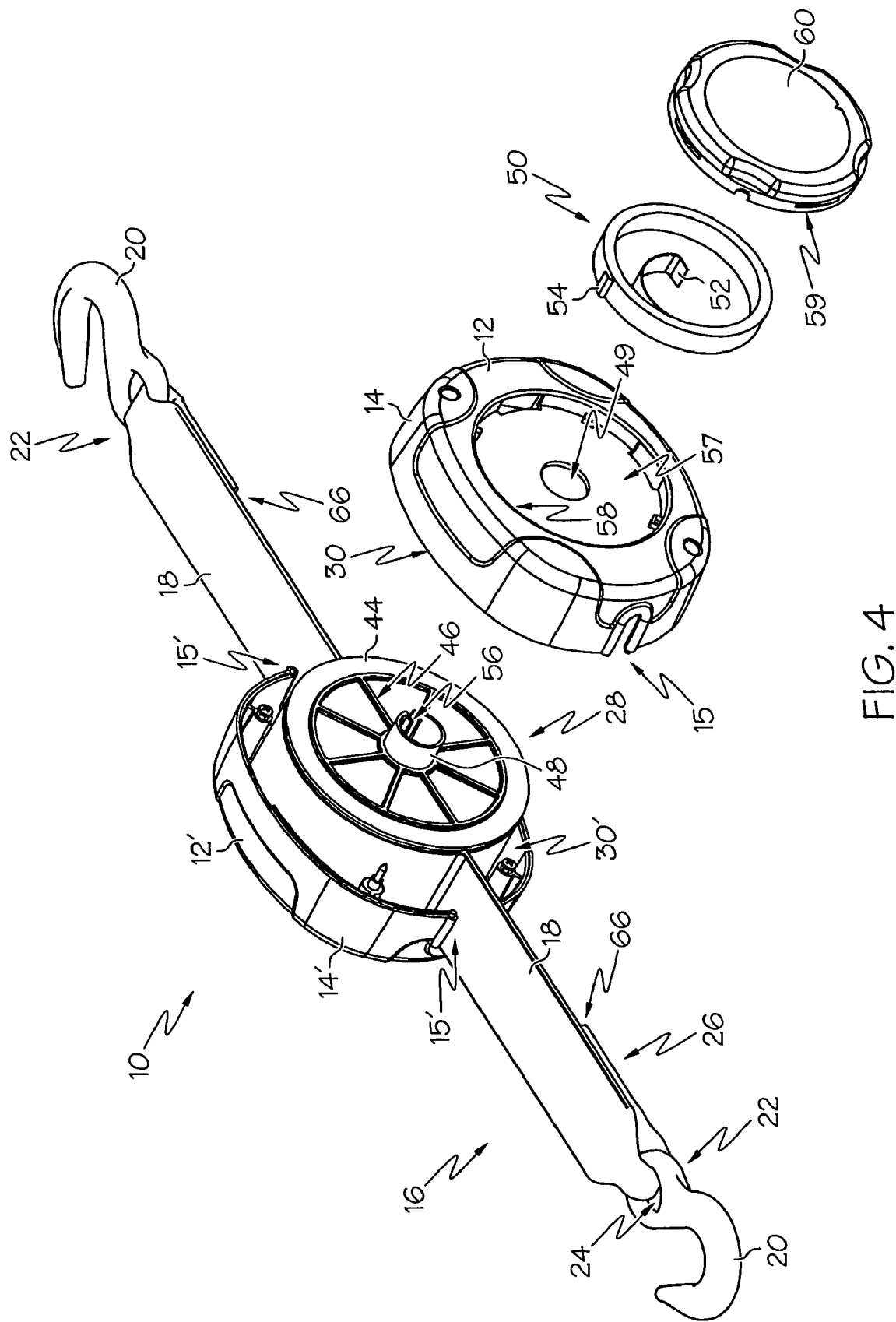
FIG. 4 illustrates a partially exploded perspective view of the tow strap apparatus of FIG. 2.

As shown in FIGS. 3-4, the tow strap apparatus can further include means for biasing 50 the reel 26 to wind the tow strap 16 onto the hub 36. In one, example, the means for biasing 50 is means for automatically rotating the reel 26 to wind the tow strap 16 onto the hub 36. In another example, the means for biasing 50 is means for continuously rotating the reel 26 to automatically wind the tow strap 16 onto the hub 36. The means for biasing 50 can provide a biasing force ($R_1$, $R_2$—see FIG. 1) to rotate the reel 26 and thereby wind the tow strap 16 thereon. In one example, the means for biasing 50 can include a spring, such as a spiral spring, coil spring, helical torsion spring, cantilevered spring, gas spring, etc., though it can also include various other resilient elements that can provide a biasing force to rotate the reel 26. In the shown example, the means for biasing 50 includes two spiral springs to provide balanced rotation of the reel 26. Each spiral spring can comprise a conventional spiral spring having a metal strip coiled in a particular direction, or can even comprise a power spring having a portion of the metal strip coiled in a first direction and having another portion coiled in an opposite direction to provide additional performance characteristics, such as greater force and/or dampening features. Each spiral spring can also include an inner end 52 and an outer end 54. The inner end 52 can be configured to engage complementary structure 56 of the protrusion 48 of the reel 28, such as a slot or the like. Similarly, the outer end 54 can be, configured to engage complementary structure 58 of the casing 12. Alternatively, the inner and outer ends 52, 54 can engage the casing 12 and the reel 28, respectively.

The complementary structure 58 can be located on the casing 12, or it can be part of an element attached to the casing 12. For example, as shown, a cover plate 60 can attach to a portion of the casing 12, and the complementary structure 58 (e.g., a slot or the like) can be located thereon. The cover plate 60 can be removably or non-removably attached to the casing 12 using various methods, adhesives, fasteners, snap fittings, or welding, or the cover plate 60 can even be formed with the casing 12. In addition, either or both of the casing 12 and the cover plate 60 can include a recessed portion 57, 59, respectively, for housing the spring 50.

The means for biasing 50 can also be adapted to rotationally couple the reel 28 to the casing 12. Thus, as the reel 28 rotates relative to the casing 12 in one direction, the spring 50 can store potential energy, and conversely, when the spring is rotated in the opposite direction, the spring can release the stored potential energy. In the shown example, the biasing force of the means for biasing 50 can be configured to wind the tow strap 16 about the hub 36. It is to be appreciated that the means for biasing 50 can exert the biasing force $R_1$, $R_2$ upon each portion of the tow strap webbing 18 that extends out of the casing 12. Thus, extension of the tow strap 16 from the casing 12 can store potential energy in the spring, and retraction of the tow strap 16 can release the stored energy.

Accordingly, as shown in FIG. 1, the means for biasing 50 can be configured to automatically wind the tow strap webbing 18 onto the hub 36 when the biasing force $R_1$, $R_2$ is greater than the oppositely directed tension force $T_1$, $T_2$ applied by a towing vehicle to a towed vehicle. For example, as discussed previously, slack can be generated during the towing process when the towing vehicle 102 slows down, such as to stop or make a turn, and can cause the tow strap webbing 18 to be unable to maintain tension (e.g., the actual tension in the tow strap webbing 18 is less than the towing tension $T_1$). In such a case, the biasing force $R_1$, $R_2$ of the means for biasing 50 can be greater than the towing force $T_1$, and can cause the tow strap webbing 18 to automatically wind about the hub 36 to take up the slack. It is to be appreciated that the means for biasing 50 can cause the webbing 18 on both sides of the casing 12 to retract at a generally equal speed and distance. Thus, because the unwanted slack can be been relieved from the tow strap webbing 18, the risk of the webbing 18 sliding under the wheel of the towed vehicle and/or be caught around the various moving parts of the vehicle and/or engage the ground and become dirty or shagged can be greatly reduced. Additionally, once the towing tension $T_1$ again exceeds the biasing force $R_1$, $R_2$ (e.g., the towing vehicle picks up speed or finishes its turn), the tow strap webbing 18 can extend from the casing 12 once again.

It is to be appreciated that the means for biasing 50 can include various other elements, such as a braking system (not shown), dampening system (not shown), and/or a clutch (not shown). However, when a spiral spring or the like is used, the means for biasing 50 can exhibit a self-braking and/or self-dampening feature. For example, spiral springs tend to exert a relatively greater force near the maximum spring compression state, and a relatively lesser force near the minimum spring compression state. Thus, as the tow strap webbing 18 is extended from the casing 12 and the spring progressively stores energy, it can become increasing difficult to extend the webbing 18 as the spring nears the maximum spring compression state (e.g., the webbing 18 nears a fully extended position). Thus, during towing, the transition between a partially extended and a fully extended tow strap webbing 18 can be naturally damped by the spiral spring to inhibit a jerking motion or the like between the vehicles 102, 104. Additionally, when the tow strap webbing 18 is being wound about the reel 28 for storage, the transition between a partially retracted and a fully retracted tow strap webbing 18 can be damped by the progressively lessening biasing force $R_1$, $R_2$ (e.g., the spring nears a minimum compression state) to inhibit a snapping motion of the tow strap 16. It is to be appreciated that the various braking/dampening performance characteristics can be achieved by the aforementioned power spring.

As stated previously, the tow strap 16 is configured to wind about the hub 36 between a fully extended position 62, as shown in FIGS. 1 and 5, and a fully retracted position 64, an example of which can be seen in FIG. 2. In the fully retracted position 64, the tow strap webbing 18 is generally completely wound about the hub 36, though it is to be appreciated that the ends 22 of the tow strap 16 can extend various distances from the casing 12. For example, as shown in FIG. 2, the ends 22 can extend a relatively large distance from the casing 12, though they can also extend a relatively small distance, such as where the means for attaching 20 (e.g., a hook) is in contact with the casing 12 or even extends within the casing 12. The amount of extension of the ends 22 can be controlled in various manners, such as by varying the relative sizes of the reel 28 and the hub 36, and/or by using a stop 66 that can interact with the apertures 15 of the casing 12. For example, the doubled-over portion 26 of the tow strap webbing 18 can create a shoulder or the like to inhibit passage through the aperture 15.

Turning now to FIG. 5, when the tow strap 16 is in the fully extended position 62, the tow strap apparatus 10 can be configured to transmit substantially all of a tension force (e.g., $T_1$, $T_2$) applied by a towing vehicle 102 to a towed vehicle 104 through only the tow strap 16. As stated previously, the hub 36 can include an aperture 38 that can have a geometry similar to that of the webbing 18 to permit the webbing 18 to extend completely therethrough. Additionally, as stated previously, the tow strap webbing 18 can comprise a non-disjoint strap that extends sequentially through one of the apertures 15 of the casing 15, through the aperture 38 of the hub 36, and through the other aperture 15 of the casing 12. Thus, when the tow strap 16 is in the fully extended position 62, substantially all of the tension force can be transmitted through the tow strap webbing 18 and the means for attaching 20. That is, the tension force (e.g., $T_1$, $T_2$) is not exerted against either the casing 12 or the reel 28. It is to be appreciated that although the teeth 40 can inhibit the webbing 18 from moving relative to the casing 12, the teeth 40 are not intended to be load-bearing components. Thus, because neither the casing 12 nor the reel 28 are load-bearing components, they can include relatively weaker and cheaper materials, such as plastics or the like, as opposed to relatively stronger and expensive materials, such as metals.

Additionally, where the various apertures 15, 38 are arranged so as to be generally co-planar with each other, the tension force can be applied generally linearly along a longitudinal direction L (i.e., along a longitudinal axis) of the tow strap webbing 18. Further, the towing ability of the tow strap apparatus 10 can be limited only by the tensile strength of the various materials of the tow strap 16. For example, as shown, where a nylon-based tow strap webbing 18 has a rated tensile strength of 5,000 lbs., and the hooks 20 have an equal or greater rated tensile strength, the actual towing ability of the tow strap apparatus 10 should be generally equal to 5,000 lbs. Therefore, the tow strap apparatus 10 can perform at or near the rated tensile strength of the tow strap webbing 18, despite the usage of relatively weaker materials (e.g., plastics, etc.) for the construction of various elements (casing 12, reel 28, etc.) that can have lower tensile strength ratings.

Figure 6:
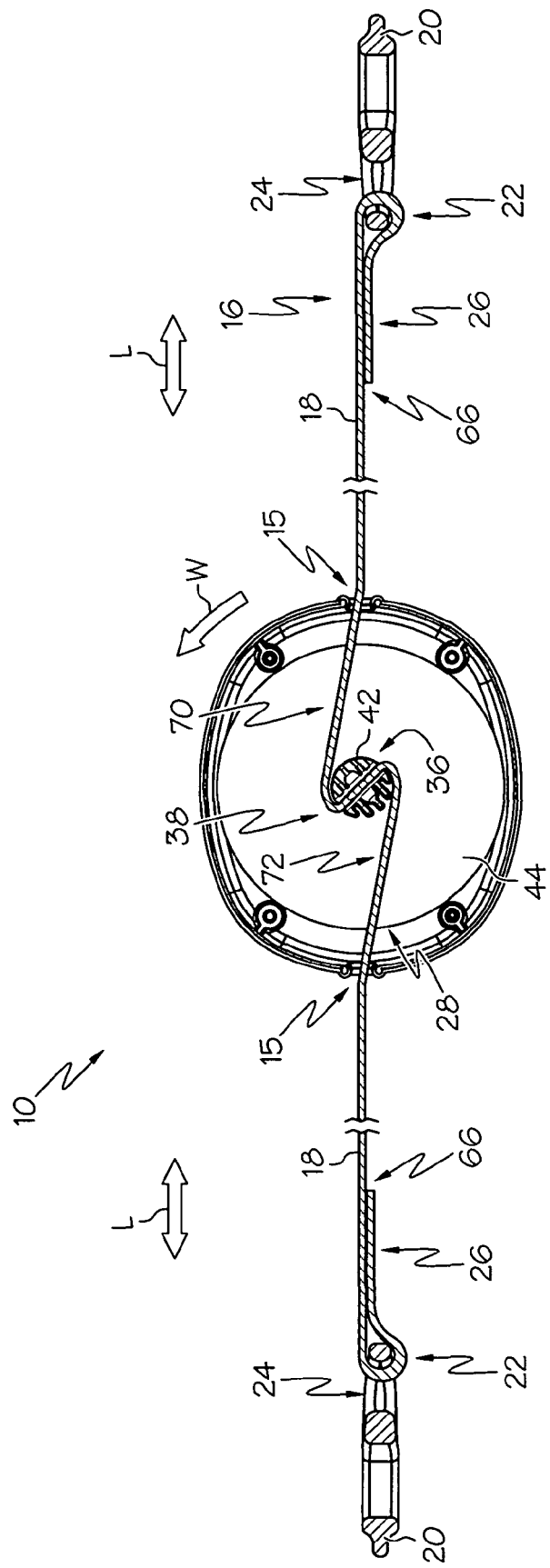
FIG. 6 is similar to FIG. 5, but shows an example tow strap webbing being retracted within an example protective casing.

The tow strap apparatus 10 can also include various other features. For example, the tow strap apparatus 10 can include features to provide for generally equal retraction and extension of the ends 22 of the webbing 18 from the casing 12. As shown in FIG. 6, when the tow strap webbing 18 initially begins to wind about the hub 36 in the direction indicated by arrow W, one portion 70 of the webbing 18, located on one side of the hub 36, can draw a relatively greater amount of the webbing 18 into the casing 12. Conversely, another webbing portion 72, located on the opposite side of the hub 36, can draw a relatively lesser amount of the webbing 18 into the casing 12. To alleviate this problem, the reel 28 can be configured to grasp a portion of the tow strap webbing 18 at a specified location.

For example, as shown in FIG. 5, the reel 28 can be configured to grasp (e.g., through the teeth 40) a portion of the tow strap webbing 18 at a location 76 spaced a distance from the midpoint 74 of the tow strap webbing 18 along its longitudinal length. The grasping location 76 can be spaced various distances from the midpoint 74, such as a few inches. Thus, during winding and unwinding of the tow strap webbing 18 about the reel 28, the differential distance between the location 76 and the midpoint 74 can account for the aforementioned greater initial webbing 18 draw, and as a result, the ends 22 of the tow strap webbing 18 can each extend and retract a generally equal length $D_1$, $D_2$ (see FIG. 1) from the casing 12. Conversely, if the hub 36 were to grasp the webbing 18 at its midpoint 74, then the webbing 18 could retract unevenly into the casing (e.g., one side would retract faster than the other side) due to the initial differential webbing 18 draw. It is to be appreciated that the midpoint 74 can include the geometrical centerline of the webbing 18, though it could also include other values based upon other parameters (e.g., differential webbing thickness).

The invention has been described with reference to various example embodiments. Obviously, modifications and alterations will occur to others upon a reading and understanding of this specification. It is intended to include all such modifications and alterations insofar as they come within the scope of the appended claims or the equivalents thereof.

What is claimed is:

1. A retractable tow strap apparatus for towing a vehicle, comprising:

a protective casing;

a reel disposed within the casing and including a hub;

a tow strap for winding about the hub between a fully extended position and a fully retracted position such that, in the fully retracted position, the tow strap is wound about the hub, the tow strap further including a tow strap webbing and means for attaching at least one end of the tow strap webbing to a vehicle to be towed; and means for automatically rotating the reel to automatically wind the tow strap onto the hub;

wherein when the tow strap is in the fully extended position, the tow strap apparatus is configured to transmit substantially all of a tension force applied by a towing vehicle to a towed vehicle through only the tow strap, wherein the tow strap webbing comprises a non-disjoint tow strap webbing having two ends that are each extendable from the casing such that, in the fully extended position, the tow strap webbing is completely unwound from the hub, and wherein the hub includes a first component, a second component and an aperture extending therethrough, and wherein at least one of the first component and second component includes teeth extending toward and engaging the tow strap webbing to grasp a portion of the tow strap webbing to inhibit the webbing from moving with respect to the aperture of the hub when the tow strap is in the fully extended position.

2. The tow strap apparatus of claim 1, wherein the tension force applied by a towing vehicle to a towed vehicle is not exerted against either the casing or the reel.

3. The tow strap apparatus of claim 1, wherein the means for automatically rotating applies a biasing force to the tow strap webbing and is configured to automatically wind the tow strap webbing onto the hub when there is slack in the tow strap webbing.

4. The tow strap apparatus of claim 3, wherein the means for automatically rotating includes at least one spiral spring.

5. The tow strap apparatus of claim 1, wherein the reel is configured to grasp a portion of the tow strap webbing at a location spaced a distance from the midpoint of the tow strap webbing along its longitudinal length such that, during winding and unwinding of the tow strap webbing about the reel, the ends of the tow strap webbing each extend a generally equal length from the casing.

6. The tow strap apparatus of claim 1, wherein the casing includes at least two opposing apertures extending therethrough that are configured to be generally co-planar with each other and with the aperture of the hub, and wherein in the fully extended position, the tow strap extends sequentially through one of the apertures of the protective casing, through aperture of the hub, and through the other aperture of the protective casing such that the tow strap webbing is completely unwound from the hub and the tension force can be applied generally linearly along a longitudinal direction of the tow strap webbing.

7. The tow strap apparatus of claim 1, wherein the means for attaching includes a hook.

8. A retractable tow strap apparatus for towing a vehicle, comprising:
a protective casing;
a reel disposed within the casing and including a hub;
a tow strap webbing for winding about the hub between a fully extended position and a fully retracted position and having a sufficient strength for towing a vehicle, wherein the tow strap webbing comprises a non-disjoint tow strap webbing having two ends that are each extendable from the casing in generally opposite directions such that, in the fully extended position, the tow strap webbing is completely unwound from the hub;
means for attaching at least one end of the tow strap webbing to a vehicle to be towed; and
means for automatically rotating the reel to automatically wind the webbing onto the hub by applying a biasing force to the tow strap webbing, the means for automatically rotating the reel being configured to automatically wind the tow strap webbing onto the hub when there is slack in the tow strap webbing,
wherein the hub includes a first component, a second component and an aperture extending therethrough, and wherein at least one of the first component and second component includes teeth extending toward and engaging the tow strap webbing to grasp a portion of the tow strap webbing to inhibit the webbing from moving with respect to the aperture of the hub when the tow strap is in the fully extended position.

9. The tow strap apparatus of claim 8, wherein a tension force applied by a towing vehicle to a towed vehicle is not exerted against either the casing or the reel.

10. The tow strap apparatus of claim 8, wherein the means for automatically rotating the reel includes at least one spiral spring.

11. The tow strap apparatus of claim 10, wherein the spiral spring includes one end coupled to the reel, and another end coupled to a portion of the protective casing.

12. The tow strap apparatus of claim 8, wherein the reel is configured to grasp a portion of the tow strap webbing at a location spaced a distance from the midpoint of the tow strap webbing along its longitudinal length such that, during winding and unwinding of the tow strap webbing about the reel, the ends of, the tow strap webbing each extend a generally equal length from the casing.

13. The tow strap apparatus of claim 8, wherein the casing includes at least two opposing apertures extending therethrough that are configured to be generally co-planar with each other and with the aperture of the hub, and wherein in the fully extended position, the tow strap extends sequentially through one of the apertures of the protective casing, through aperture of the hub, and through the other aperture of the protective casing such that the tow strap webbing is completely unwound from the hub and the tension force can be applied generally linearly along a longitudinal direction of the tow strap webbing.

14. The tow strap apparatus of claim 8, wherein the means for attaching includes a hook.

15. A retractable tow strap apparatus for towing a vehicle, comprising:
a protective casing;
a reel disposed within the casing and including a hub, wherein the reel is formed of a plurality of elements;
a non-disjoint tow strap webbing for winding about the hub, between a fully extended position and a fully retracted position and having a sufficient strength for towing a vehicle, wherein the tow strap webbing includes two ends that are each extendable from the casing in generally opposite directions such that, in the fully extended position, the tow strap webbing is completely unwound from the hub;
means for attaching at least one end of the tow strap webbing to a vehicle to be towed; and
means for automatically rotating the reel to automatically wind the tow strap webbing onto the hub, the means for automatically rotating being configured to rotationally couple the reel to the casing,
wherein the hub includes a first component, a second component and an aperture extending therethrough, and wherein at least one of the first component and second component includes teeth extending toward and engaging the tow strap webbing to grasp a portion of the tow strap webbing to inhibit the webbing from moving with respect to the aperture of the hub when the tow strap is in the fully extended position.

16. The tow strap apparatus of claim 15, wherein the means for automatically rotating includes at least one spiral spring.

17. The tow strap apparatus of claim 15, wherein the reel is configured to grasp a portion of the tow strap webbing at a location spaced a distance from the midpoint of the tow strap webbing along its longitudinal length such that, during winding and unwinding of the tow strap webbing about the reel, the ends of the tow strap webbing each extend a generally equal length from the casing.

18. The tow strap apparatus of claim 15, wherein the casing includes at least two opposing apertures extending therethrough that are configured to be generally co-planar with each other and with the aperture of the hub, and wherein in the fully extended position, the tow strap extends sequentially through one of the apertures of the protective casing, through aperture of the hub, and through the other aperture of the protective casing such that the tow strap webbing is completely unwound from the hub and the tension force can be applied generally linearly along a longitudinal direction of the tow strap webbing.

19. The tow strap apparatus of claim 15, wherein the means for attaching includes a hook.

20. A retractable tow strap apparatus for towing a vehicle, comprising:
- a protective casing having at least two opposing apertures extending therethrough, wherein the at least two apertures are configured to be generally co-planar;
- a reel rotatably disposed within the casing and including a hub having an aperture extending therethrough, the aperture being configured to be generally co-planar with the at least two apertures of the protective casing, the reel further including a pair of sidewalls rotatable together with the hub and configured to retain the tow strap webbing as it is wound about the hub, and a pair of protrusions each configured to be rotatably supported by a portion of the protective casing and rotatable relative to the protective casing;
- a tow strap webbing for winding about the hub between a fully extended position and a fully retracted position and having a sufficient strength for towing a vehicle, wherein in the fully extended position the tow strap extends sequentially through one of the apertures of the protective casing, through the aperture of the hub, and through the other aperture of the protective casing such that the tow strap webbing is completely unwound from the hub and a tension force can be applied generally linearly along a longitudinal direction of the tow strap webbing;
- means for attaching at least one end of the tow strap webbing to a vehicle to be towed; and
- first and second springs for automatically rotating the reel to wind the tow strap webbing onto the hub, each of the first and second springs being coupled to a respective one of the pair of protrusions and configured to rotationally couple the reel to the protective casing,
- wherein the hub includes a first component and a second component, at least one of the first component and second component includes teeth extending toward and engaging the tow strap webbing to grasp a portion of the tow strap webbing to prevent inhibit the webbing from moving with respect to the aperture of the hub when the tow strap is in the fully extended position.

21. The tow strap apparatus of claim 20, wherein the tension force is not exerted against either the casing or the reel.

22. The tow strap apparatus of claim 20, wherein the first and second springs each includes a spiral spring having one end coupled to one of the pair of protrusions, and another end operatively coupled to the protective casing.

23. The tow strap apparatus of claim 20, wherein the means for attaching includes a hook.

24. A retractable tow strap apparatus for towing a vehicle, comprising:
- a protective casing;
- a reel disposed within the casing and including a hub;
- a tow strap for winding about the hub between a fully extended position and a fully retracted position such that, in the fully retracted position, the tow strap is wound about the hub, the tow strap further including a tow strap webbing and means for attaching at least one end of the tow strap webbing to a vehicle to be towed; and
- means for automatically rotating the reel to wind the tow strap onto the hub;
- wherein when the tow strap is in the fully extended position, the tow strap apparatus is configured to transmit substantially all of a tension force applied by a towing vehicle to a towed vehicle through only the tow strap, and
- wherein the tow strap webbing comprises anon-disjoint tow strap webbing having two ends that are each extendable from the casing such that, in the fully extended position, the tow strap webbing is completely unwound from the hub, and
- wherein the hub includes a first component, a second component and an aperture extending therethrough, and wherein at least one of the first component and second component includes teeth extending toward and engaging the tow strap webbing to grasp a portion of the tow strap webbing to inhibit the webbing from moving with respect to the aperture of the hub when the tow strap is in the fully extended position.

* * * * *

UNITED STATES PATENT AND TRADEMARK OFFICE
CERTIFICATE OF CORRECTION

| | |
|---|---|
| PATENT NO. | : 7,942,360 B2 |
| APPLICATION NO. | : 11/504385 |
| DATED | : May 17, 2011 |
| INVENTOR(S) | : Winston Breeden |

Page 1 of 1

It is certified that error appears in the above-identified patent and that said Letters Patent is hereby corrected as shown below:

Column 6, line 7, after "spring", please delete "50";
Column 6, line 34, after "be", please delete "been";
Column 10, line 25, after "hub", please delete ",";
Column 11, line 38, after "to", please delete "prevent";

Signed and Sealed this
Eleventh Day of October, 2011

David J. Kappos
*Director of the United States Patent and Trademark Office*